(12) United States Patent
Lanciaux

(10) Patent No.: US 8,733,749 B2
(45) Date of Patent: May 27, 2014

(54) APPARATUS AND METHOD FOR CONVERTING INSULATED PANELS

(76) Inventor: Fran Lanciaux, Grand Rapids, OH (US)

( * ) Notice: Subject to any disclaimer, the term of this patent is extended or adjusted under 35 U.S.C. 154(b) by 687 days.

(21) Appl. No.: 12/449,181

(22) PCT Filed: Jan. 28, 2008

(86) PCT No.: PCT/US2008/001080
§ 371 (c)(1),
(2), (4) Date: Jul. 27, 2009

(87) PCT Pub. No.: WO2008/091709
PCT Pub. Date: Jul. 31, 2008

(65) Prior Publication Data
US 2010/0089210 A1    Apr. 15, 2010

Related U.S. Application Data

(60) Provisional application No. 60/897,968, filed on Jan. 27, 2007.

(51) Int. Cl.
*B25B 11/00*        (2006.01)
*B23Q 1/00*         (2006.01)

(52) U.S. Cl.
USPC .............................. 269/21; 269/54.4; 269/296

(58) Field of Classification Search
USPC ..................... 269/21, 53, 56.4, 296; 451/456; 211/57.1, 125
See application file for complete search history.

(56) References Cited

U.S. PATENT DOCUMENTS

| | | | |
|---|---|---|---|
| 3,588,059 A * | 6/1971 | Ward et al. | 432/234 |
| 3,832,956 A | 9/1974 | Briel, Jr. | |
| 4,139,051 A * | 2/1979 | Jones et al. | 165/80.1 |
| RE31,053 E * | 10/1982 | Firtion et al. | 355/77 |
| 4,581,965 A * | 4/1986 | Gerber | 83/24 |
| 4,983,081 A | 1/1991 | Cunningham, Jr. | |
| 5,141,212 A * | 8/1992 | Beeding | 269/21 |
| 6,059,494 A | 5/2000 | Susnjara | |
| 6,298,555 B1 | 10/2001 | Vincenti | |
| 7,035,707 B2 * | 4/2006 | Susnjara et al. | 700/159 |
| 2003/0001103 A1 * | 1/2003 | Kobayashi et al. | 250/440.11 |
| 2006/0083889 A1 | 4/2006 | Schuckers | |
| 2006/0206233 A1 | 9/2006 | Carpenter et al. | |
| 2006/0242818 A1 | 11/2006 | Penick et al. | |

* cited by examiner

*Primary Examiner* — Lee D Wilson
*Assistant Examiner* — Jamal Daniel
(74) *Attorney, Agent, or Firm* — David C. Purdue

(57) ABSTRACT

A method for producing a duct from a planar board having two opposed substantially parallel edges with metal foil facings on opposed major surfaces of the board is disclosed. The method comprises making planar cuts through one of the metal foil facings and at least most of the planar board there below to produce a blank with 3 parallel "V shaped grooves which are parallel to angled edges of the blank. A duct is formed by folding the blank so that the "V" shaped grooves form three of the edges of the duct, and the angled edges form the fourth of the edges.

6 Claims, 10 Drawing Sheets

APPARATUS AND METHOD FOR CONVERTING INSULATED PANELS

BACKGROUND OF THE INVENTION

1. Field of the Invention

The present invention relates to methods and apparatus for converting flat boards for use in constructing ducts and duct fittings. The methods and the apparatus are particularly well suited for use with boards that are rigid or semi-rigid and are produced specifically for use in fabricating insulated ducts for heating, ventilating and air conditioning applications.

2. Description of the Prior Art

Boards that are commercially available today are being produced for use in forming thermally insulating ducts such as are employed for heating, ventilation and air conditioning. In one case, these boards consist of a rigid foamed plastics material, namely, a closed cell expanded phenolic foam in the form of a planar board having a metallic foil such as aluminum bonded to each major surface. One example of such a board is sold under the trademark KOOLDUCT®. The apparatus and methods of the present invention are especially well suited for use with such planar boards although the methods and apparatus are also suitable for use with other foil faced planar boards, for example, boards consisting of open cell or closed cell expanded foam materials, such as polyurethanes. Such boards are referred to herein generally as "foam boards". They are to be distinguished from other duct materials such as sheet metal and fiber board typically made from glass fibers with resins and/or binders to provide stiffness.

The fabrication of ducts and duct fittings from foam boards is quite different from the fabrication of ducts and duct fittings from conventional metal sheets. For one thing, sheet metal can be treated fairly roughly and foam board, in general, tends to be more fragile and frangible than sheet metal and some extra care needs to be taken in handling foam board and in fabricating ducts and duct fittings from it. However, foam board is remarkably light, with excellent thermal insulating properties, and often sufficiently rigid itself for duct applications although long unsupported spans, large cross-sectional areas, or significant differential pressures between interior and exterior may require reinforcement or additional support. There are numerous other advantages to foam board in heating, ventilating and air conditioning applications, vis-à-vis sheet metal and fiber board, as well. Foam board is very robust. Ducts made from it can handle pressures of up to four inches of water column. Accordingly, better fabrication apparatus and methods are needed to expand the use of this important material.

SUMMARY OF THE INVENTION

The present invention is a machine based system for pre-cutting foam board for producing parts from which ducts and duct fittings can be readily produced. The invention, in one aspect, is an improved method for producing a duct from a planar board having two opposed substantially parallel edges with metal foil facings on opposed major surfaces of the board. The method comprises the steps of making a plurality of planar cuts through one of the metal foil facings and at least most of the planar board therebelow to produce a blank with n parallel "V" shaped grooves which are parallel to angled edges of the blank, the walls which are adjacent the "V" shaped grooves intersecting one another at an angle of substantially 360 divided by n plus 1 degrees, and a plane which intersects the bottom of one of the angled edges of the blank and is parallel to the opposed angled edge of the blank forms the same angle with the wall it intersects, and forming a duct by folding the blank so that the "V" shaped grooves form all but one of the edges of the duct, and the angled edges form the last one of the edges of the duct. Usually, the duct has four sides, and the angle between adjacent sides is 90 degrees.

In another aspect, the invention is apparatus for processing foam boards having a central core composed of a cellular body and parallel top and bottom layers of an impervious material adhered to the central core. The apparatus comprises a work table, means for supporting a work piece above the table so that there is a plenum between the bottom of the foam board work piece and the top of the table, means for withdrawing air from the plenum to establish and maintain a vacuum therein, a cutter, means for causing the cutter to undergo straight-line translational movement relative to the foam board being processed where the straight line is parallel to the top and bottom impervious material layers, and means for supporting the cutter so that it is operable to cut the foam board being processed to each of a plurality of distances above or below one of the impervious material layers.

In still another embodiment, the invention is a foamboard sheet having cuts which extend therethrough and constitute edges of the bottom, of the top, and of two sides of a duct which can be produced from the board, The sheet also has cuts which extend only part way therethrough and constitute parts of the ends, of the bottom, of the top, and of two sides of the duct which can be produced from the board. The foamboard sheet can be shipped to a construction site, the duct parts can be cut therefrom, and the duct can be assembled from the parts.

The invention is also concerned with a workpiece hold down system for a three axis cutting machine. The hold down system comprises a work table having an upper surface, a plurality of pegs for supporting a work piece in spaced relationship with the work table upper surface so that a plenum is defined between the work table upper surface and a major surface of the work piece. Vacuum ports connect the plenum and a vacuum system connected to withdraw a sufficient quantity of air from the plenum to increase the frictional engagement between the pegs and the work piece so that the work piece is held fast on the pegs, even while the cutting machine removes portions of the work piece. Preferably, the vacuum system is of the centrifugal blower type.

The invention is a method for converting foam board for the production of duct work comprising the steps of supporting a foam board on a work table provided at a first location and removing material from the foam board to define elements of the duct work. Some material is removed from the foam board by the formation of straight cut channels that do not extend entirely through the foam board so that the board remains intact in the vicinity of the straight cut channels, and remains in one piece. Thereafter, the foam board with straight cut channels is transported to a second location, and a hand tool is used to cut entirely through the foam board in the locations of the straight cut channels, to separate the foam board into duct work component pieces.

Accordingly, it is an object of this invention to provide a system for accurately and easily producing such parts.

It is another object of the invention to provide such a system in which pieces are defined by cuts made in a workpiece wherein the pieces remain in the workpiece while they are transported to a job site.

It is yet another object of the invention to provide a system where a hand tool can be used on site to easily and accurately separate the duct pieces, previously cut off site, from one another and from scrap in the workpiece for assembly and installation on site.

These and other objects and advantages of the invention will be apparent from the following detailed description of the invention including the preferred embodiments, reference being made therein to the attached drawing figures.

BRIEF DESCRIPTION OF THE DRAWING FIGURES

DETAILED DESCRIPTION OF THE PREFERRED EMBODIMENTS

Figure 1:
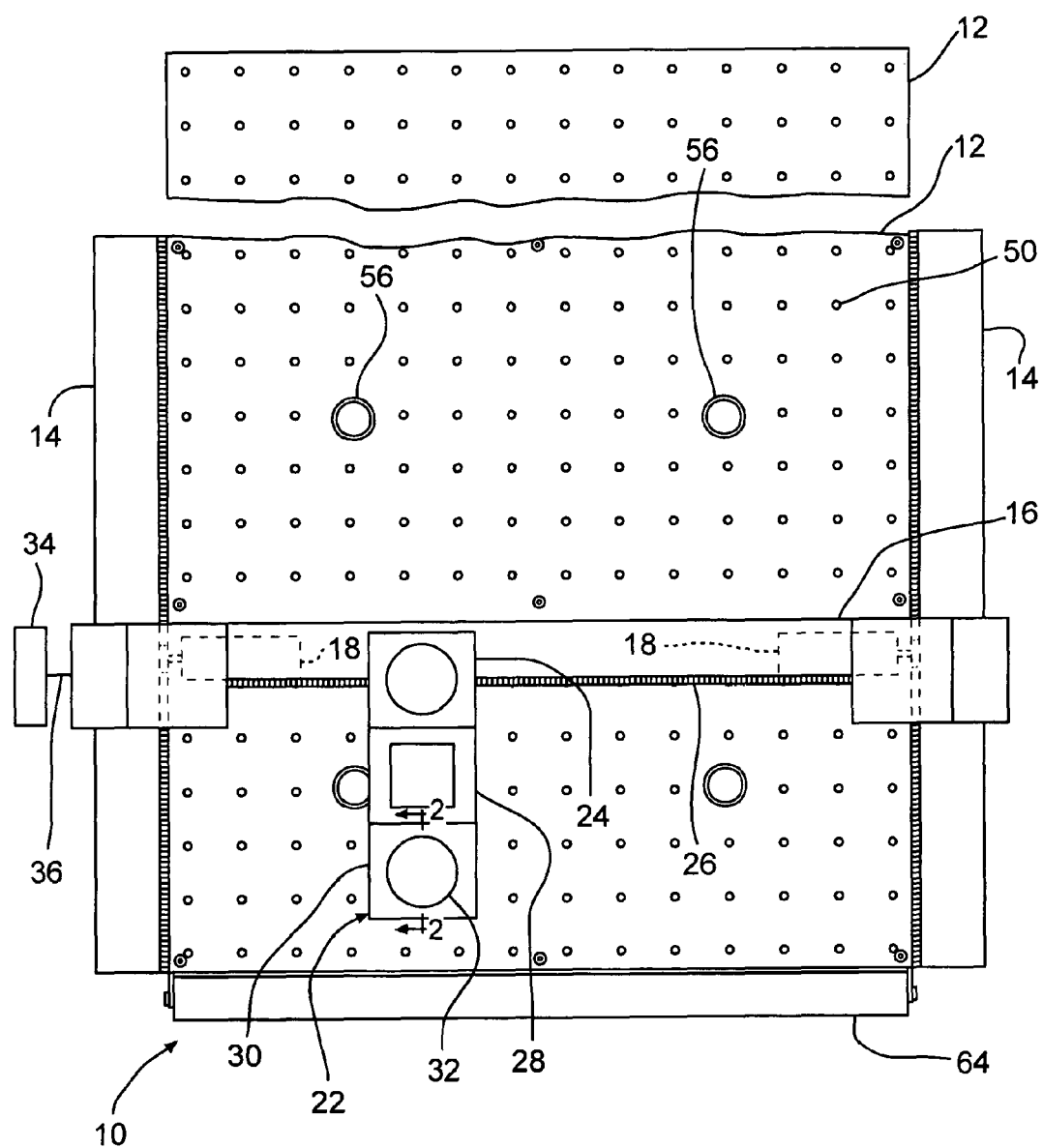
FIG. 1 is a top view of apparatus according to the present invention for pre-cutting foam board.

Referring now in more detail to the drawing figures, FIG. 1 shows a three axis (X, Y and Z) cutting machine indicated generally at 10 and including a work table 12 supported on a frame, side members of which are indicated at 14. A gantry 16 is supported relative to the table 12 for movement in the "Y" direction (up and down in FIG. 1) under the action of tandem stepper motors 18 mounted on the gantry 16 for movement therewith relative to the frame members 14 and, specifically, relative to tracks 20 supported thereon. It will certainly be appreciated that other Y axis actuators or actuator systems, now known or hereinafter developed, may be incorporated in the apparatus 10 to effect movement of the gantry 16 in the Y direction.

Mounted on the gantry 16, for movement therewith, is a tool carriage indicated generally at 22 and comprising an X axis actuator 24 for effecting movement of the carriage 22 in the "X" direction (left and right in FIG. 1) relative to the gantry 16 and relative to a track 26 mounted on the gantry 16. Again, it will certainly be appreciated that other X axis actuators or actuator systems, now known or hereinafter developed, may be incorporated in the apparatus 10 to effect movement of the tool carriage 22 in the X direction.

Figure 2:
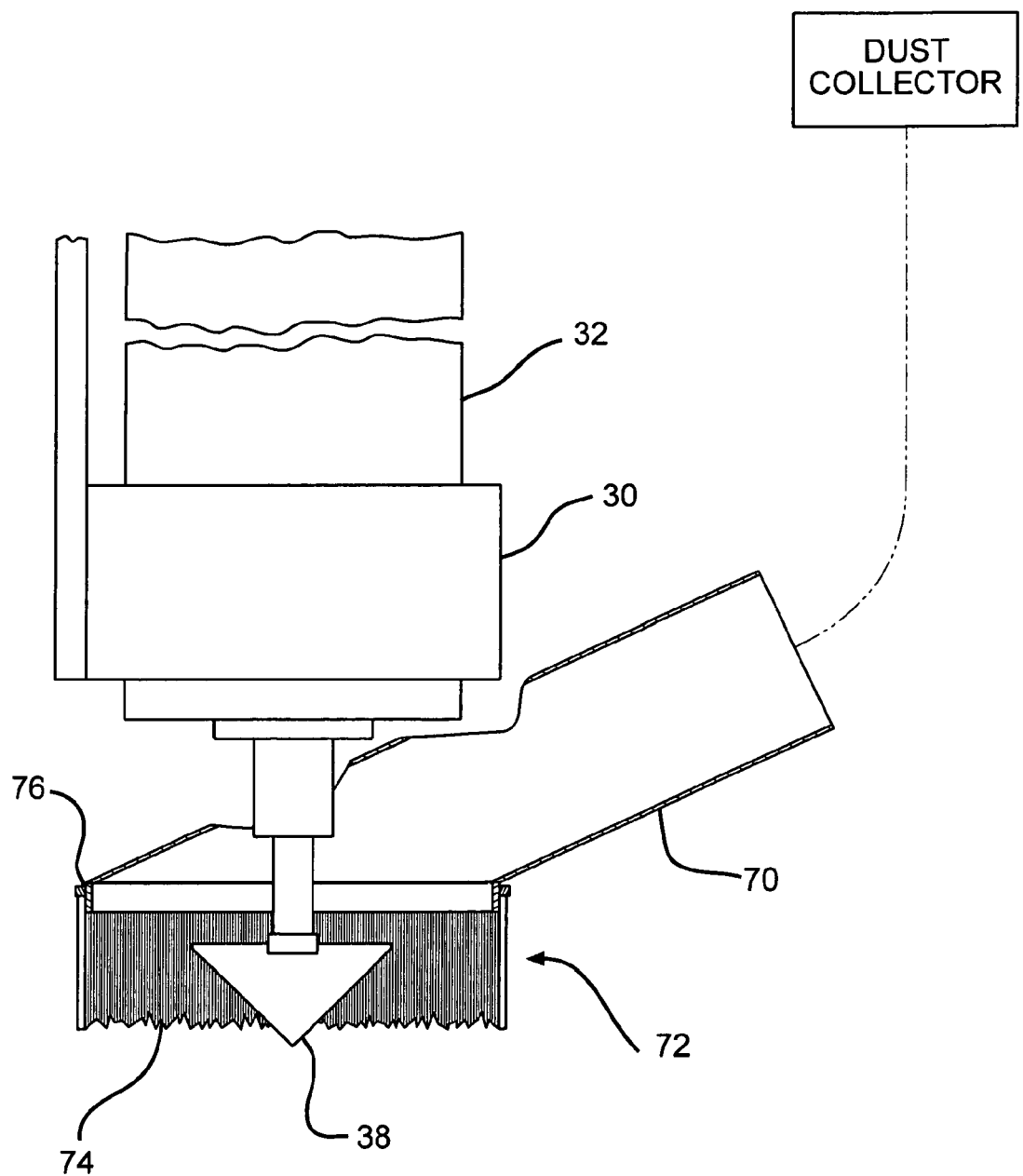
FIG. 2 is a side view, partially in cross-section, of a cutter and motor and a portion of a foam chip removal system which are part of the apparatus shown in FIG. 1.

The tool carriage 22 (FIGS. 1 and 2) includes a Z axis actuator for effecting movement of a tool holder 30 and a tool 32 carried therein in the "Z" direction (up and down in FIG. 2). Yet again, it will certainly be appreciated that other Z axis actuators or actuator systems, now known or hereinafter developed, may be incorporated in the apparatus 10 to effect movement of the tool holder 30 in the Z direction.

The X axis actuator, the Y axis actuator and the Z axis actuator are controlled by a programmable machine 34 that is operable to convert layout information into control signals that are delivered through a connector 36 to the apparatus and to the X, Y and Z actuators to control the position of a cutter 38 carried by the tool 32 relative to the work table 12 and a workpiece WP (FIGS. 4 through 6) supported on the work table 12. Under the control of the control signals, the actuators are operable to move the cutter 38 in a predetermined path to effect desired, predetermined removal of portions of the workpiece. The cutter 38 comprises two straight cutting edges which are ninety degrees offset from one another.

Figure 4:
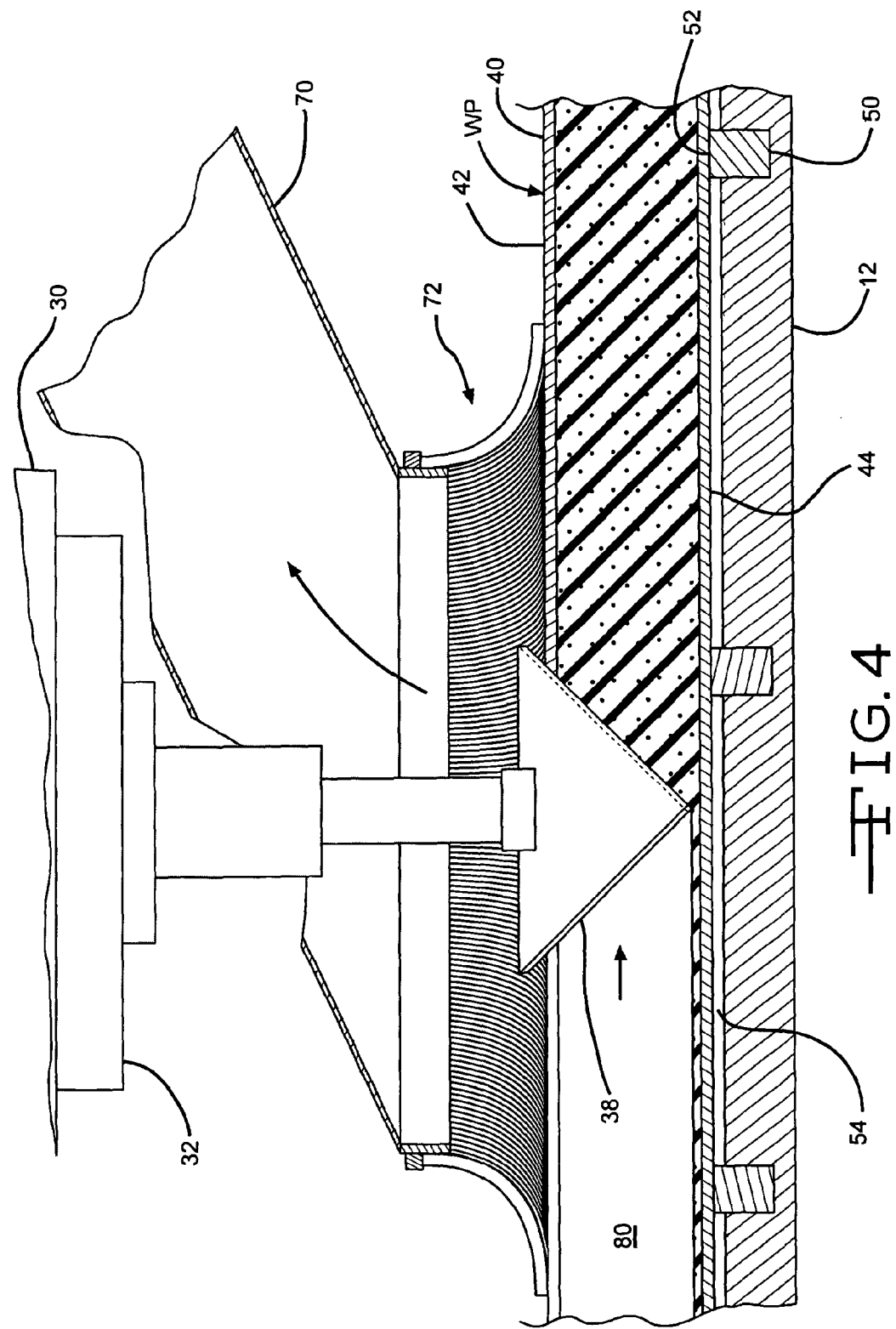
FIG. 4 is a view, partially in cross-section, of a cutter cutting a workpiece according to one aspect of the method of the present invention.
Figure 5:
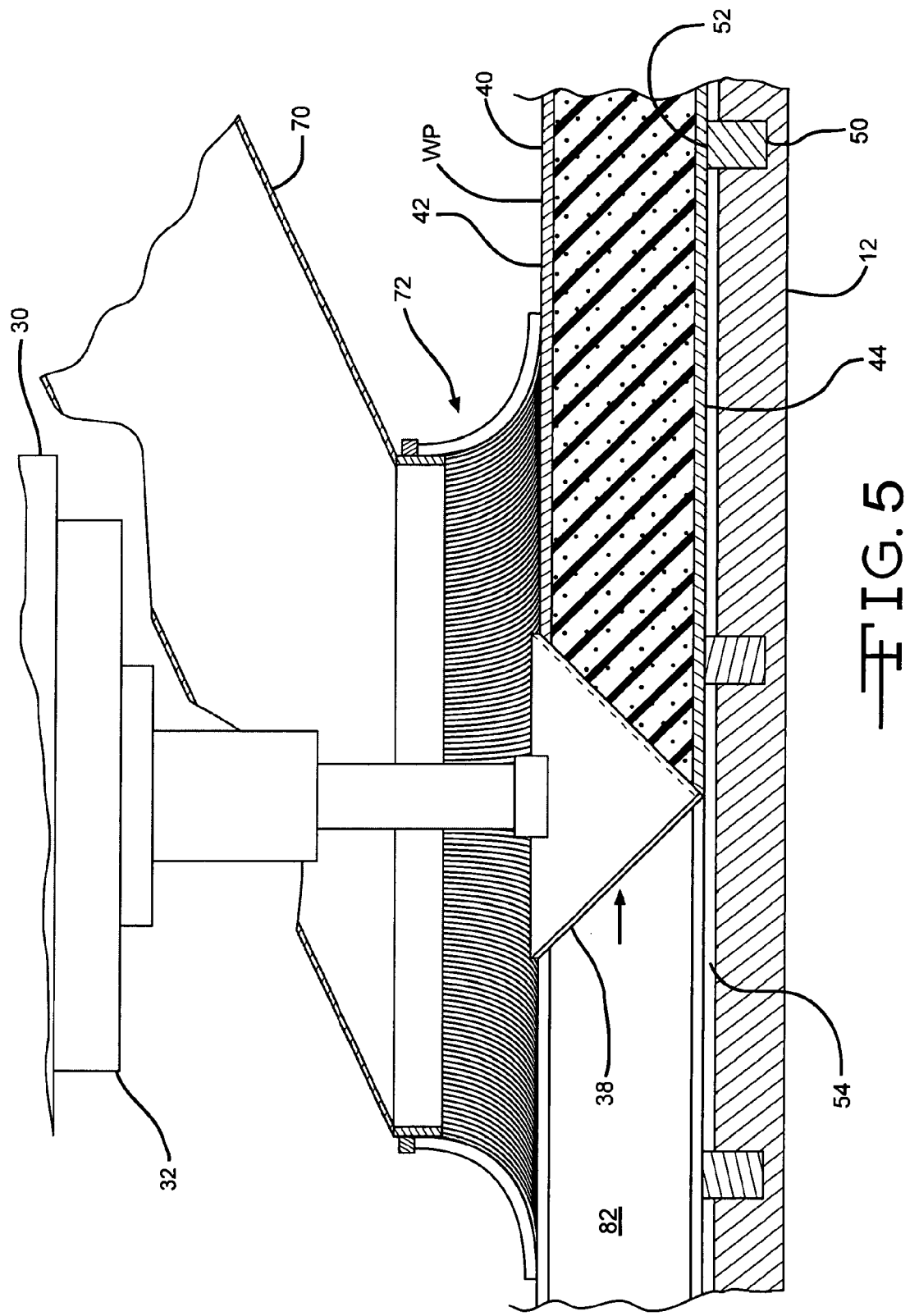
FIG. 5 is a view, partially in cross-section, of a cutter cutting a workpiece according to a second aspect of the method of the present invention.
Figure 6:
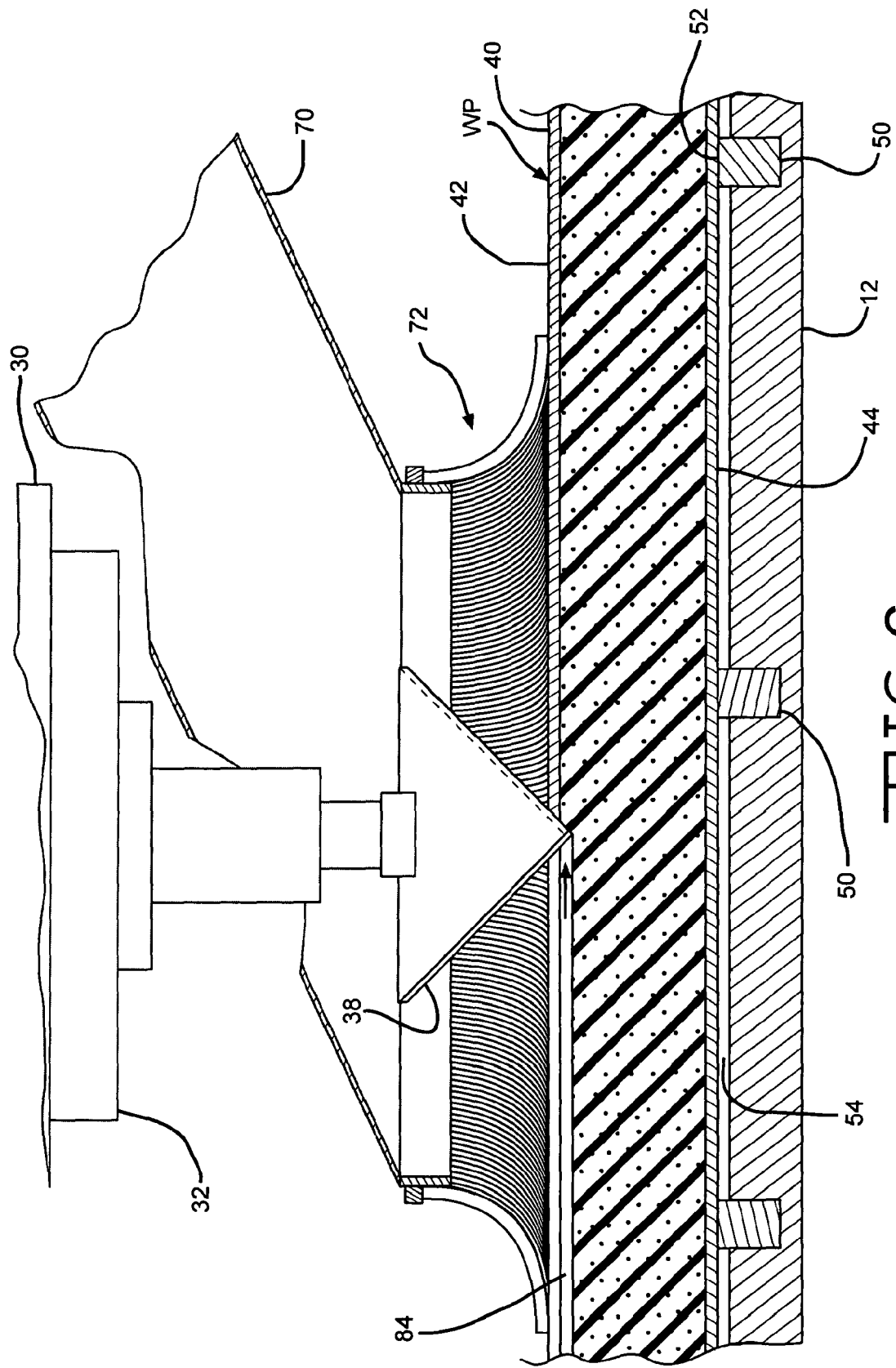
FIG. 6 is a view, partially in cross-section, of a cutter cutting a workpiece according to a third aspect of the method of the present invention.

As shown in FIGS. 4 through 6, the workpiece WP may comprise a foam board 40 sandwiched between an upper fiber reinforced foil layer 42 and a lower fiber reinforced foil layer 44 secured to and covering upper and lower surfaces of the foam board 40. Such workpieces are available commercially under the trademark KOOLDUCT® and this product is presently sold in thicknesses of 22 mm and 28 mm although other thicknesses may be introduced. This product is extremely light weight and, in order to process it on the cutting machine 10, the workpiece must be held firmly and securely yet gently so that no damage befalls the workpiece. Also, as indicated above, other materials may be converted using the method and apparatus of the present invention.

Figure 3:
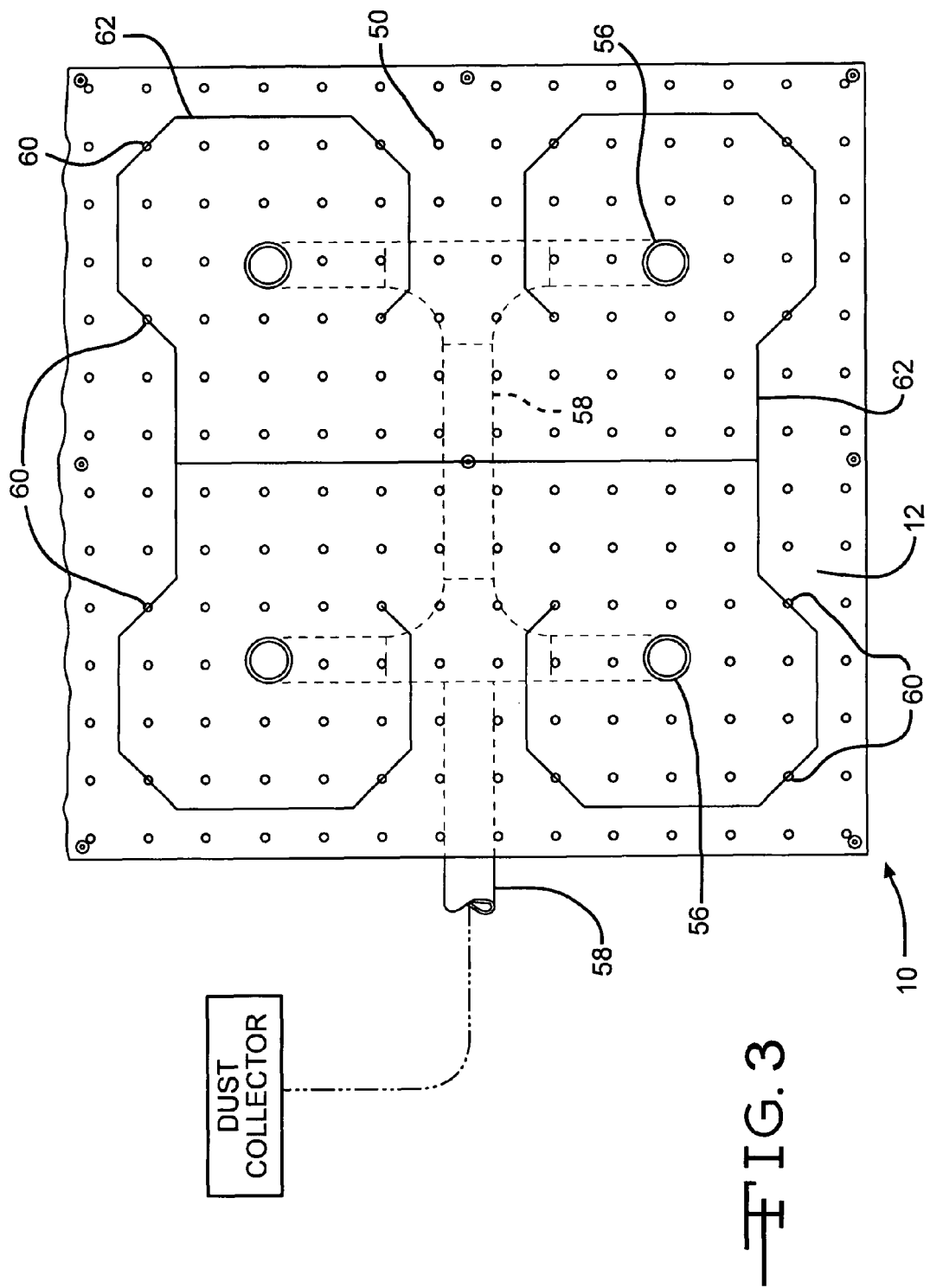
FIG. 3 is a top view of a work table and a workpiece hold down system which are part of the apparatus shown in FIG. 1.

In order to secure a workpiece on the work table 12, the cutting machine 10 is equipped with a workpiece hold-down system and it comprises a series of support pegs 50 (FIGS. 1 and 3 through 6) with upper surfaces 52. The pegs 50 are inserted into bores in the work table 12 and it is preferred that the bores be spaced somewhat evenly and good results have been obtained with the pegs 50 and the bores spaced about 4 inches apart in a pattern corresponding with the pattern shown in FIGS. 1 and 3. As can be seen in FIGS. 4 through 6, the lower foil layer 44 rests on the upper surfaces 52 of the pegs 50 creating a plenum 54 between the foil layer 44 and the upper surface of the work table 12. Air is withdrawn from the plenum through vacuum ports 56 which are openings that extend through the work table 12 and are in communication with conduits 58 that, in turn, are connected to the inlet of a suction based dust collector or some other vacuum source. It is preferred that a centrifugal fan based dust collector be used, for reasons discussed below. In FIGS. 2 and 3, Dust Collector refers to any suitable vacuum source, however. The negative pressure condition in the plenum draws the foil layer 44 and the workpiece WP into close contact with the peg surfaces 52 and holds the workpiece WP fast against the pegs 50, even while the cutter 38 acts on the work piece. This workpiece hold-down system prevents movement of the workpiece WP in the X direction, the Y direction and the Z direction, relative to the work table 12. The programmable machine may be used to control the establishment and dis-establishment of the negative pressure condition in the plenum 54.

When the vacuum ports 56 are not withdrawing air from the plenum 54, the workpiece WP will be supported on the pegs 50 but it will just be resting on them so that it can be lifted and removed from the machine 10. It will be appreciated that the work table 12 and the work piece WP may be quite long and the removal of a large workpiece WP from the work table 12 can be facilitated by directing air under pressure against the lower foil later 44 of the workpiece WP. Referring to FIG. 3, a system is shown schematically for directing pressurized air against the bottom of a workpiece WP. In FIG. 3, some of the pegs 50 have been replaced by tubes 60 which extend through the work table 12 so that an upper end of each tube terminates in an end that is substantially the same height above the table 12 as are the upper surfaces 52 of the pegs 50. Below the work table 12, the tubes 60 are connected to one or more conduits 62 which are connected to a source for pressurized air (not shown) so that air under pressure can be selectively delivered to and up through tubes 60, when desired, to lift the workpiece WP and facilitate its removal from the work table 12. This can also be brought under the control of the programmable machine, if desired. A workpiece roller 64 (FIG. 1) is positioned to help support a workpiece WP as it is delivered to or removed from the work table 12.

Referring now again to FIG. 2, apparatus for collecting material that has been removed from a workpiece WP comprises a conduit 70 that provides communication between a cutter shroud 72 and a vacuum source, which is referred to in the drawing FIG. 2 as a Dust Collector. The cutter shroud 72 is comprised of many long flexible bristles 74 supported on a shroud ring in a generally cylindrical configuration so that the bristles 74 generally surround the cutter and extend from the shroud ring 76 to an upper surface of a workpiece WP. As indicated above, it is preferred that the Dust Collector be a centrifugal fan based dust collector and that it serve double duty in the sense that it (I) provides a vacuum source to move chips of material removed from a workpiece from the cutter shroud to the Dust Collector and (II) withdraws air from the plenum 54 in the workpiece hold-down system described above. In this case, the volume of air being withdrawn from the vacuum ports 56 will be greater than the volume of air being drawn through the cutter shroud conduit 70. Excellent results have been achieved with a Delta centrifugal fan based dust collector system serving double duty as described above.

Referring now to FIG. 4, the workpiece WP is being held down against the pegs 50 by a reduced pressure condition in the plenum 54 and the cutter 38 has been positioned, relative to the Z direction, at a point where the tip of the cutter 38 is just above the lower foil layer 44. The cutter 38 is being advanced in the direction of the arrow (in the X direction or the Y direction or both) and a groove 80 is being formed in the work piece WP. The groove 80 is being cut in the foam board 40 and it is defined by two walls that are ninety degrees offset from each other as one would expect from the shape of the cutter blade 38 which comprises two cutting edges that form a ninety degree angle between them. The lower foil layer 44 remains intact below the groove and it can serve as a hinge for the panels on either side of the groove 80. As pieces of the upper foil layer 42 and the foam board 40 are removed by the cutter 38, they are drawn into the conduit 70 and conducted to and collected in the Dust Collector.

Referring now to FIG. 5, the workpiece WP is being held down against the pegs 50 by a reduced pressure condition in the plenum 54 and the cutter 38 has been positioned, relative to the Z direction, at a point where the tip of the cutter 38 is just through the lower foil layer 44. The cutter 38 is being advanced in the direction of the arrow (in the X direction or the Y direction or both) and a groove cut 82 is being formed in the work piece WP. The lower foil layer 44 is being cut and a groove is being cut into the foam board 40. This groove cut 82 will separate two pieces of the workpiece WP, one from the other, on either side of the groove cut 82. As pieces of the foil layers 42 and 44 and pieces of the foam board 40 are removed by the cutter 38, they are drawn into the conduit 70 and conducted to and collected in the Dust Collector.

Referring now to FIG. 6, the workpiece WP is being held down against the pegs 50 by a reduced pressure condition in the plenum 54 and the cutter 38 has been positioned, relative to the Z direction, at a point where the tip of the cutter 38 is just a short distance below the upper surface of the foam board 40. The cutter 38 is being advanced in the direction of the arrow (in the X direction or the Y direction or both) and there is a straight cut channel 84 being formed in the work piece WP. The lower foil layer 44 remains intact and most of the foam board 40 remains intact, too. This straight cut channel 84 demarcates the interface between two pieces which will be separated later and, until they are separated by additional cutting, the straight cut channel 84 maintains the integrity of the workpiece WP so that, for example, the work piece can be loaded into a vehicle, with many other flat workpieces that have been converted according to the present invention, and transported to a job site where the final cutting (and assembly) can be carried out. This will be described further, below, with reference to FIG. 13. As pieces of the foil layer 42 and pieces of the foam board 40 are removed by the cutter 38, they are drawn into the conduit 70 and conducted to the Dust Collector.

Figure 7:
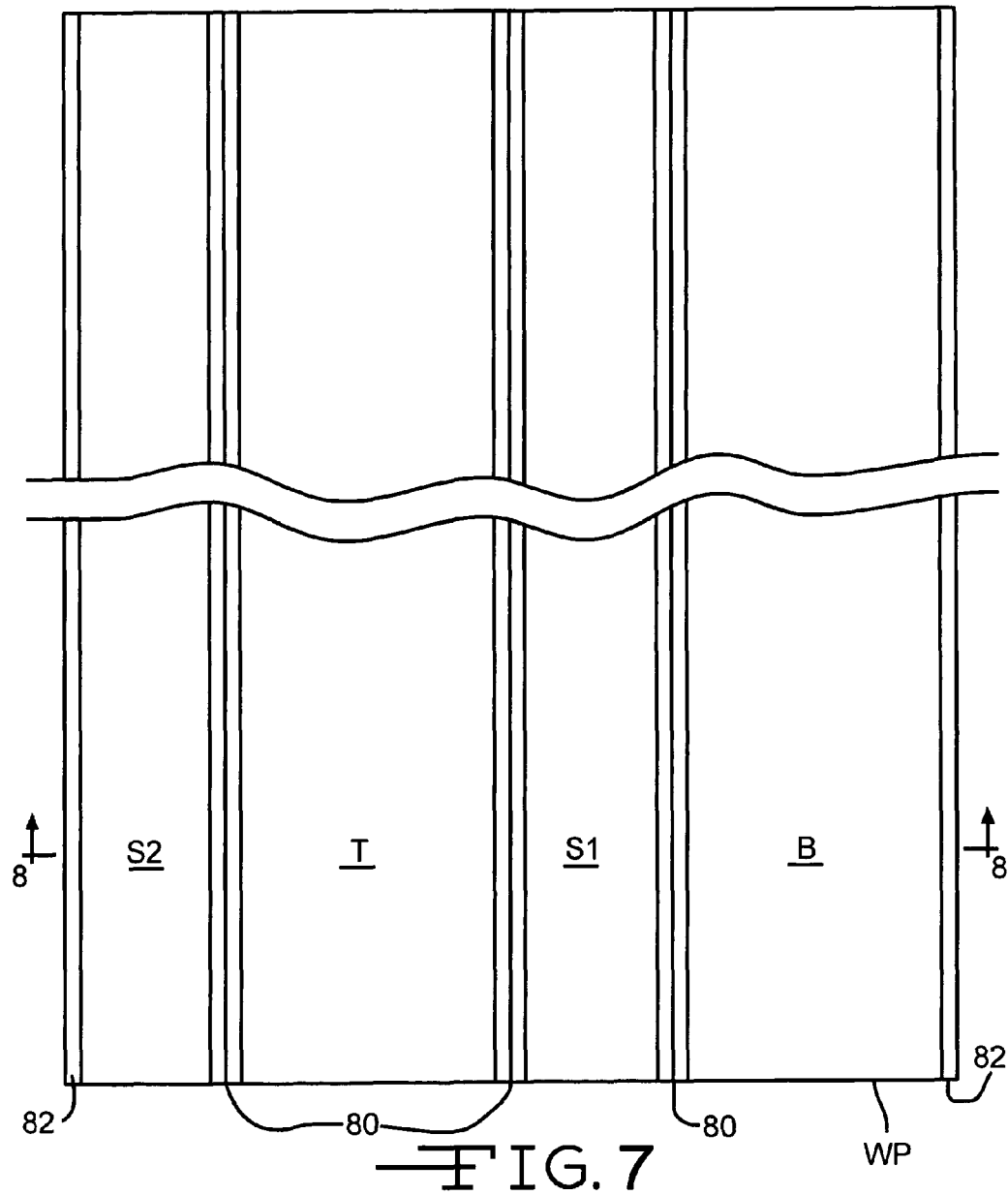
FIG. 7 is a top view of foam board after it has been precut according to the present invention for later assembly into a straight section of duct.
Figure 8:
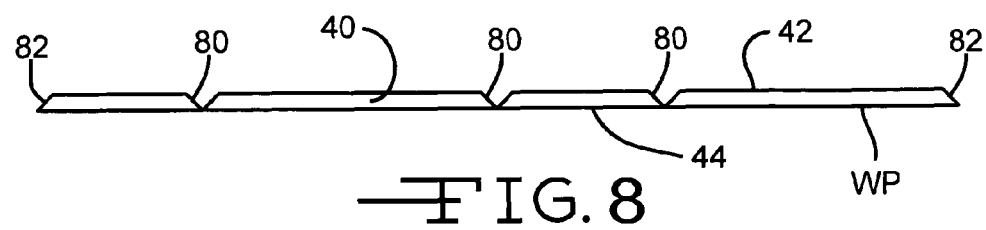
FIG. 8 is an end view of the precut foam board shown in FIG. 7 before it is assembled into a straight section of duct.
Figure 9:
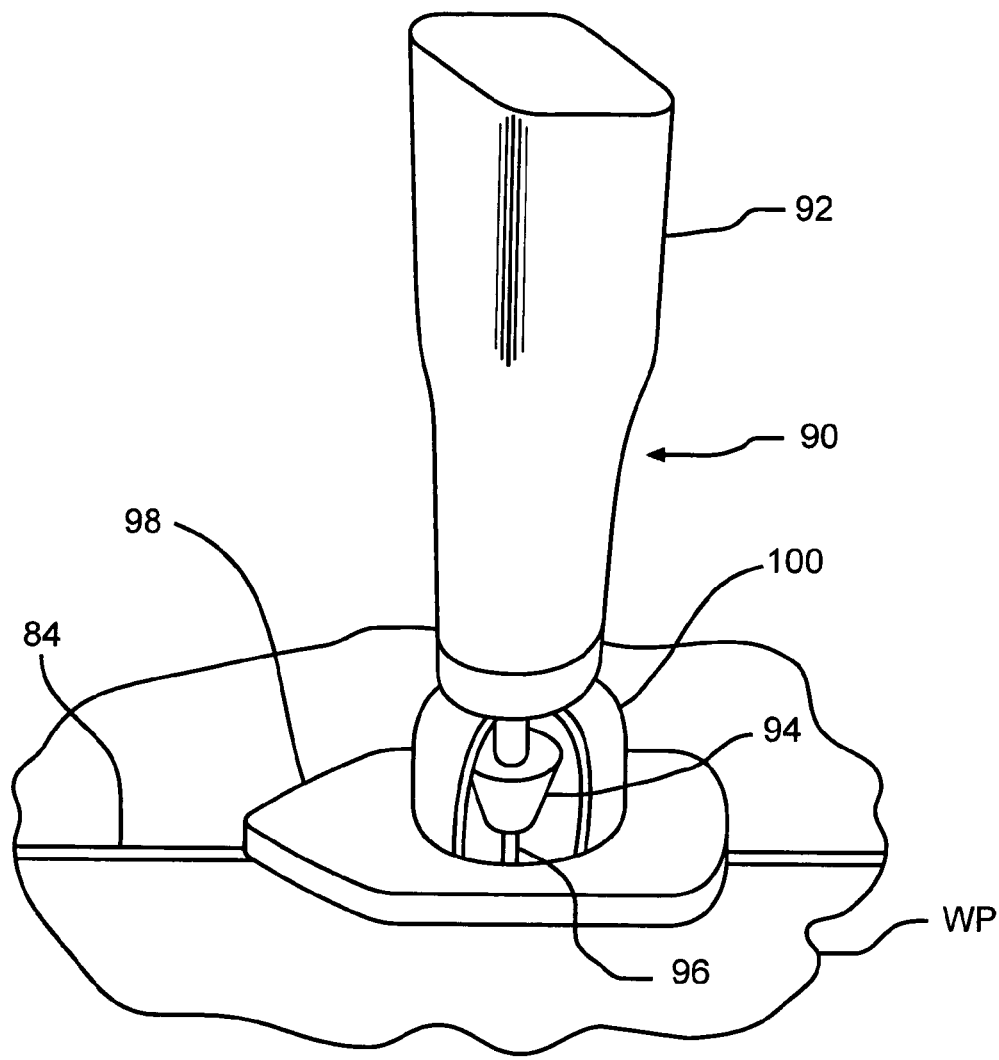
FIG. 9 is a perspective view of a hand held cutter used in the method of the present invention.
Figure 10:
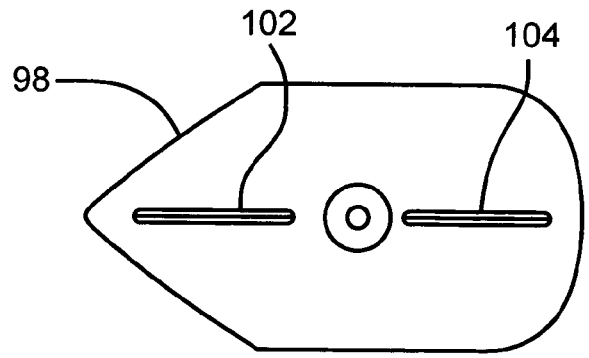
FIG. 10 is a bottom view of the cutter shown in FIG. 9.
Figure 11:
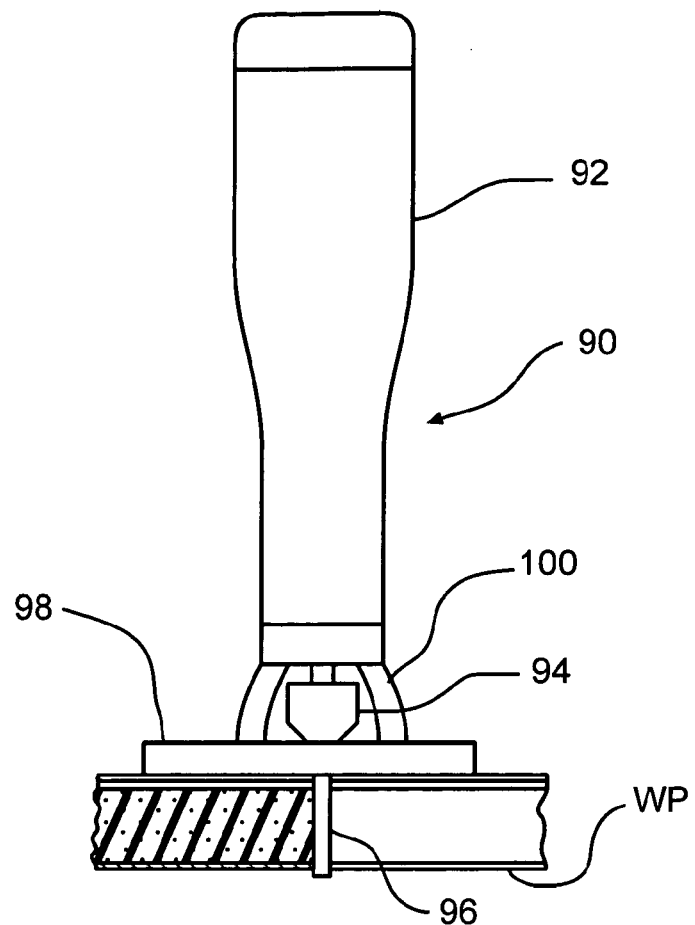
FIG. 11 is a side view of the cutter shown in FIG. 9 as it is cutting foam board according to the method of the invention.

The apparatus of the present invention is used to create grooves 80 in foam board workpieces, to create groove cuts 82 in foam board workpieces and to create straight cut channels 84 in foam board workpieces. The grooves 80 and groove cuts 82 are especially useful in producing straight sections of duct with square or rectangular cross sections. Referring now to FIGS. 7 and 8, material has been removed from a workpiece WP to produce linearly extending grooves 80 and linearly extending groove cuts 82, all of which are substantially parallel. The bottom B of a finished duct is defined between a groove cut 82 and an adjacent groove 80. A first side S1 of the duct is defined between the previously mentioned groove 80 and an adjacent groove 80. A top T of the duct is defined between the previously mentioned groove 80 and an adjacent groove 80 and the second side S2 of the duct is defined between the previously mentioned groove 80 and a groove cut 82. The lower foil layer 44 remains intact in each of the grooves 80 and it acts as a hinge allowing the bottom B to pivot ninety degrees relative to the first side S1 which, in turn, can pivot ninety degrees relative to the top T, and so on until the two groove cut surfaces at the edge of second side S2 and the edge of the bottom B will come together to form a duct (not shown) with a rectangular cross section. Construction of the duct can be completed by taping or otherwise securing the bottom B to the second side S2 in known fashion.

Figure 12:
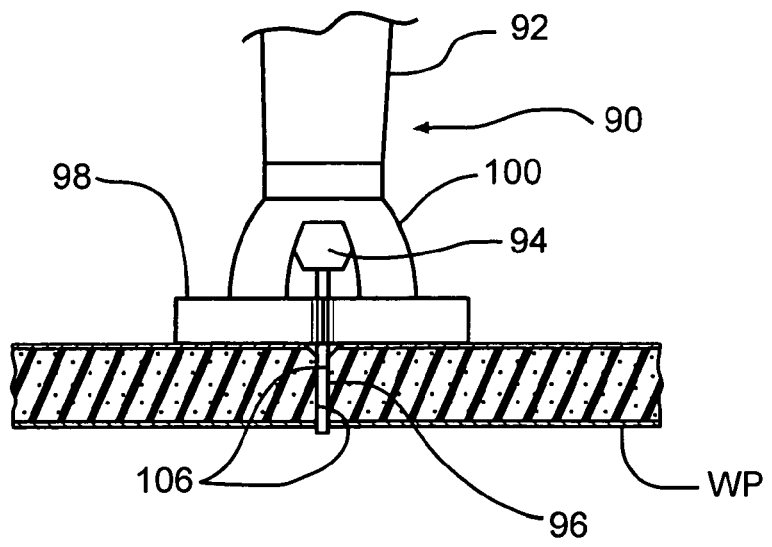
FIG. 12 is an end view of the cutter shown in FIG. 9 as it is cutting foam board according to the method of the invention.

Referring now to FIGS. 9 through 12, a straight cut channel cutter is indicated generally at 90. The channel cutter 90 comprises a rotary tool 92 with a chuck 94 in which a side cutting tool 96 is mounted. A guide 98 is supported on the business end of the rotary tool 92 by two flanges 100 so that the side cutting tool 96 extends in a direction that is perpendicular to the bottom surface, shown in FIG. 10, of the guide 98. Extending from the bottom surface of the guide 98 is a first guide ridge 102 which is shaped to be received in a straight cut channel 84. A second guide ridge 104, also shaped to be received in a straight cut channel, extends from the bottom surface of the guide 98 on the other side of the side cutting tool 96 from where the first guide ridge 102 is located. In use, the straight cut channel cutter 90 can be positioned with the first guide ridge 102, the second guide ridge 104, or both, in a previously cut straight cut channel, with the bottom surface of the guide 98 flat against the upper foil layer 42 or against the upper surface of a workpiece WP. The cutter 90 can then be manipulated along the straight cut channel so that the side cutting tool will cut the workpiece WP forming two walls 106 on either side of the side cutting tool 96, as shown in FIG. 12. The walls will be perpendicular to the upper and lower foil layers 42 and 44 and perpendicular to the upper and lower surfaces of the foam board 40.

Figure 13:
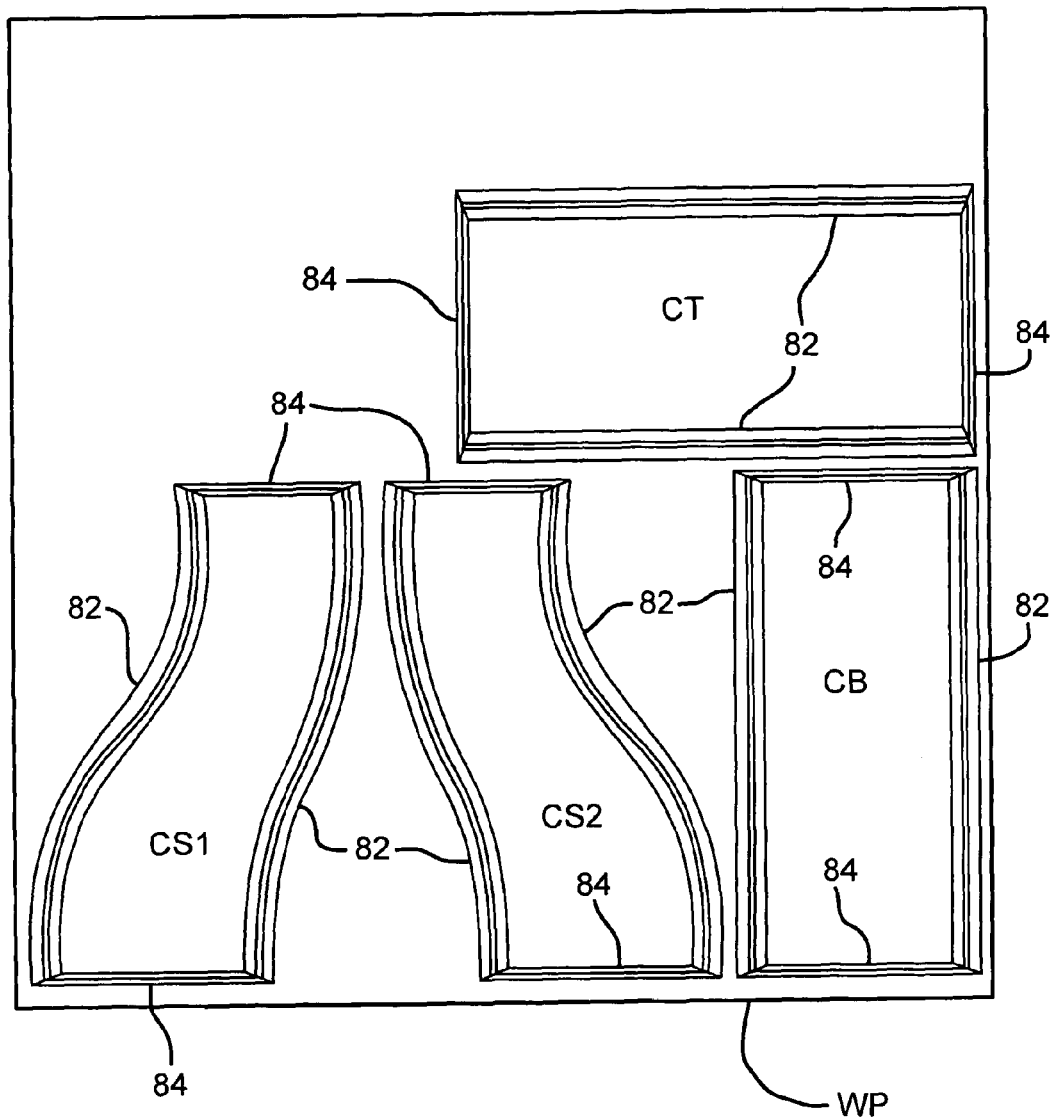
FIG. 13 is a top view of foam board after it has been precut into four intricate pieces according to the present invention to be removed from the foam board and assembled into a duct fitting.

Referring now to FIG. 13, a workpiece WP that has been processed according to the method of the invention is ready for transportation to a job site. The workpiece WP has been cut to define a first curved side CS1, a second curved side CS2, a curved top CT and a curved bottom CB. The first and second curved sides CS1 and CS2 and the curved top CT and the curved bottom CB each have four sides and two are defined by groove cuts 82 which extend all of the way through the workpiece WP and the other two of which are defined by straight cut channels 84 which extend through one of the foil surfaces and a short distance into the foam board. The portions of the foam board that remain intact in the vicinity of the straight cut channels 84 serve to keep the workpiece WP together in a single flat piece which is especially advantageous for several reasons. The four related duct pieces CS1, CS2, CB and CT are together and will remain together until they are removed and assembled, for example, at a job site. The flat panel takes up less space than would be taken up if the duct pieces were assembled into the transition duct fitting that they can be assembled into. It will be apparent to those who have utilized KOOLDUCT® that a tool, known as a bender, that is available from the distributors of KOOLDUCT®, would be used to produce gentles bends in the curved top and curved bottom CT and CB before they would be connected to the curved sides CS1 and CS2. The edges of the four pieces formed in the workpiece WP are protected from damage by scrap portions of the workpiece WP that can remain in place until the duct pieces are removed for assembly, for example, at the job site.

The workpiece WP shown in FIG. 13 can be delivered to a job site where a tool such as a straight cut channel cutter 90 can be utilized to cut through the workpiece WP in the locations of the straight cut channels 84. This will free the four pieces from scrap portions of the workpiece WP and those four pieces should be in excellent shape. The four pieces can then be assembled and installed on site.

It will be appreciated that the foregoing description is intended to enable someone of ordinary skill in the field to practice the invention and that the present invention is not limited to the exact details shown but resides as well in the broader aspects and purposes and features described herein.

The invention claimed is:

1. Apparatus for holding down a foam board having a major planar surface on a cutting machine for precutting foam boards to produce HVAC ducts, said apparatus consisting of
   a work table having an upper planar surface,
   a plurality of pegs supported on said work table and operable to support the foam board above said work table so that the major surface of the foam board is spaced substantially evenly from said work table upper planar surface and a plenum is defined between the foam board major planar surface and said work table upper planar surface,
   vacuum ports in communication with the plenum, and
   a vacuum system connected to said vacuum ports and operable to create a reduced pressure condition within said plenum.

2. The system claimed in claim 1 wherein said vacuum system is a centrifugal fan based vacuum system.

3. The apparatus claimed in claim 2 wherein said vacuum system is a centrifugal fan based vacuum system with only a single centrifugal fan.

4. Apparatus for holding down a foam board having a major planar surface on a cutting machine for precutting foam boards to produce HVAC ducts, said apparatus consisting of
   a work table having an upper planar surface,
   a plurality of pegs supported on said work table and operable to support the foam board above said work table so that the major surface of the foam board is spaced substantially evenly from said work table upper planar surface and a plenum is defined between the foam board major surface and said work table upper planar surface,
   vacuum ports in communication with the plenum,
   a shroud for collecting material removed from the foam board,
   a conduit connected to said shroud, and
   a single vacuum system,
   wherein said vacuum system is operably connected to said vacuum ports to create a reduced pressure condition within said plenum and said vacuum system is operably connected to said conduit to draw collected material into said shroud and away from the foam board.

5. The apparatus claimed in claim 4 wherein said vacuum system is a centrifugal fan based vacuum system.

6. The apparatus claimed in claim 4 wherein said vacuum system is a centrifugal fan based vacuum system with only a single centrifugal fan.

* * * * *